Oct. 20, 1942.   H. F. FRIMEL   2,299,719
HYDRAULIC VALVE
Filed Sept. 28, 1940   2 Sheets-Sheet 1

Inventor
HOBART F. FRIMEL,
By
Attorney

Oct. 20, 1942.  H. F. FRIMEL  2,299,719
HYDRAULIC VALVE
Filed Sept. 28, 1940  2 Sheets-Sheet 2

Inventor
HOBART F. FRIMEL,
By
Attorney

Patented Oct. 20, 1942

2,299,719

UNITED STATES PATENT OFFICE 2,299,719

HYDRAULIC VALVE

Hobart F. Frimel, West Los Angeles, Calif., assignor to Interstate Aircraft and Engineering Corp., a corporation of California Application September 28, 1940, Serial No. 358,769

6 Claims. (Cl. 277—20)

My invention relates to valves of the type used in hydraulic systems and the like. My valve is of the multiple type and is particularly designed for hydraulic systems such as are used on airplanes for the control and operation of flaps, landing gear, bomb doors, radiator shutter control on liquid cooled engines and for the flap control on cowling used on air cooled engines.

In airplane construction a primary consideration is lightness of parts, compactness, strength and ease of operation and in the designing of valves, for operation of the moving parts of airplanes, it particularly has been the aim to accomplish these desired features without violating safety requirements. However, valves in common use, for the purpose indicated, have not been successful in meeting these requirements and the principal object of my invention is to provide a simple and efficient valve assembly, light and compact and which may be operated by the application of less power than that required in the operation of valves now in common practice for the purposes indicated.

It is a further object of my invention to produce a valve assembly of the type described of simple form and construction of the tappet valve type in which the pressure of the fluid in the system is always against the valve tending to hold the same in seated or closed position.

It is another object of my invention to produce a valve assembly of the type referred to in which the valve operating means has the smallest ratio of lifting motion when the valve is in closed position and the greatest ratio of lifting motion when the valve is in open position thereby producing a minimum operating torque to lift the valve under the fluid pressure against the valve.

Other objects and advantages will appear hereinafter from the following description and drawings. Referring to the drawings, which are for illustrative purposes only—

Figures 1, 2, 3, 4, 5, 6, 7:
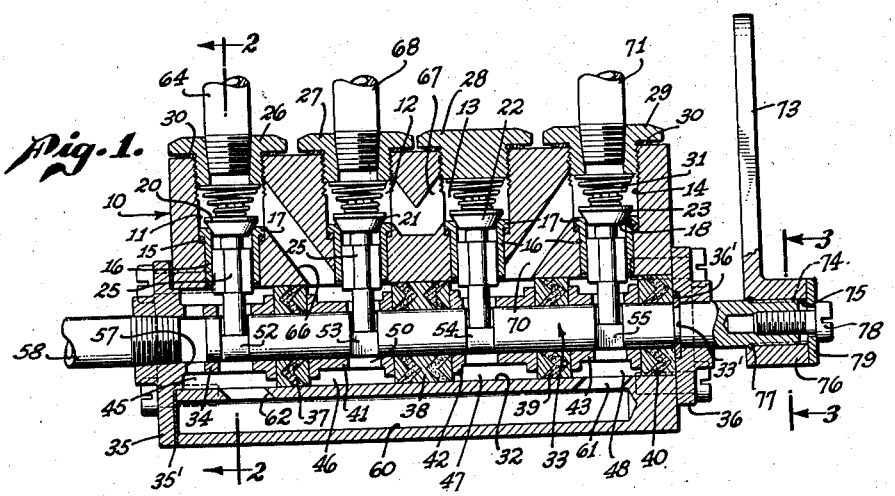
Fig. 1 is a longitudinal sectional view of a valve embodying a form of my invention.
Fig. 2 is an enlarged vertical sectional view on line 2—2 of Fig. 1.
Fig. 3 is an enlarged vertical sectional view on line 3—3 of Fig. 1.
Figs. 4, 5, 6 and 7 are enlarged cross sectional views through the valve opening cams on the operating shaft.

More particularly describing the form of my invention, illustrated in the drawings, 10 designates a valve body. This body 10 is provided with four vertical bores forming valve chambers 11, 12, 13 and 14 arranged in line in a vertical plane. Each of these chambers is provided with a shoulder upon which is seated a gasket 15. 16 designates valve seat sleeves in each chamber such sleeves being provided with a flange at their upper ends indicated at 17 seated on the gasket 15. Each sleeve 16 is provided at its upper end with a valve seat 18, upon which is seated a valve, indicated at 20, 21, 22 and 23. These valves are all of the same construction and each is provided with a valve stem 25. The upper ends of the valve chambers are provided with caps indicated at 26, 27, 28 and 29 threaded into the upper end of the respective chambers and seated on gaskets indicated at 30 on the upper face of the body. The valve caps 26, 27 and 29 are each interiorly threaded to receive pipe connections hereinafter more fully described, while the valve cap 28 is a blank forming a closure for the chamber 13. Each of the valves 20 to 23 inclusive is yieldingly held on its seat by means of a coil spring indicated at 31 and as hereinafter more fully described. When pressure is in the system it is against the valves tending to hold same on their respective seats.

Extending longitudinally through valve body 10 is a bore indicated at 32 in which is centrally disposed a rotatably mounted valve lifter shaft 33. One end of this shaft extends into and is supported by a sleeve 34 formed on a plate 35 bolted to one end of the valve body, the other end extending through a plate bolted on the opposite end of the valve body 10 indicated at 36. Indicated at 37, 38, 39 and 40 is a series of packing members in the bore 32 which support the shaft 33 which packing members are arranged in the bore 32 about the lifting shaft 33. Between the packing members 37, and 38 on the shaft 33 is a sleeve 41. A similar sleeve 42 is arranged between the packing members 38 and 39 and a similar sleeve 43 between the packing members 39 and 40. The sleeves 34, 41, 42 and 43 are each of smaller diameter than the bore 32 and provide annular chambers 45, 46, 47 and 48 therein about the shaft 33. Each sleeve is provided with oppositely disposed openings 50 through the upper of which extend the ends of the respective valve stems into engagement with the lifter cams on the valve lifter shaft 33.

Numerals 52, 53, 54 and 55 designate lifting cams formed on the valve lifter shaft which cams are set with respect to each other as illustrated in Figs. 4 to 7 inclusive. These lifting cams are eccentrically spaced on the valve lifter shaft 33 and are of semi-circular form in cross section. The center of the circular portion of each cam is offset slightly with respect to the center of the lifting shaft so that as the lifting shaft is turned either in one direction or the other as may be required to lift certain of the valves, the lifting cams have the greatest moment of lifting force at the instant of raising the valves off their seats, the continued movement of the lifting cams requiring comparatively small lifting moment. This is to accommodate the condition in the system due to the fact that the pressure in the system is always against the valves to keep the same upon their seats and that once lifted off the seats the valves have equal pressure on both sides of the valves. The plate 35 is provided with a packing ring 35' which seals off one end of the valve body. The plate 36 is countersunk as indicated at 36' to receive a C washer or split washer which fits into a groove 33' in shaft 33 for locating the shaft in the valve body. The sleeve 34 is provided with ports indicated at 57 which afford open communication from the chamber 45 to the interior of the sleeve 34 which in turn is open to pipe 58 preferably connected to a tank 59, hereinafter more particularly referred to.

Below the bore 32 is a longitudinal manifold or return passage 60 provided with a port 61 communicating with chamber 48 and a port 62 communicating with chamber 45. Valve chamber 11 is connected through a pipe 64 threaded into the valve cap 26 to one end of the cylinder indicated at 65 in Fig. 8 and such valve chamber 11 is also in open communication with chamber 46 by means of a port 66. The valve chamber 12 is connected and in open communication with valve chamber 13 by means of a port 67 and the valve chamber 12 is connected by means of a pipe 68 threaded into the valve cap 27 to a pump diagrammatically illustrated at 69 in Fig. 8. 70 indicates a port connecting chamber 47 with the valve chamber 14, which valve chamber is in turn connected by means of a pipe 71 with the opposite end of the cylinder 65.

For the purpose of rotating the valve lifter shaft 33 to operate the valves 20 to 23 inclusive through the medium of the lifting cams 52 to 55 inclusive, an arm 73 is provided which fits over the outer end of the valve lifter rod 33. The end of the valve lifter shaft 33 is provided with longitudinal grooves 74 which receive longitudinal teeth 75 formed in the hub 76 of the arm 73. This construction is for the purpose of permitting a fine adjustment as to angular position of the arm 73 on the shaft 33 so that such angular position of the shaft can be changed as may be necessary to meet the arrangement of operating mechanism for the shaft. The arm 73 is held in position on the end of the shaft 33 by means of a split ring indicated at 77 which fits into corresponding grooves formed in the hub 76 and in shaft 33. A bolt 78 is also provided extending into the shaft 33 and engaging the outer end of the hub 76 through the medium of a washer 79.

Figure 8:
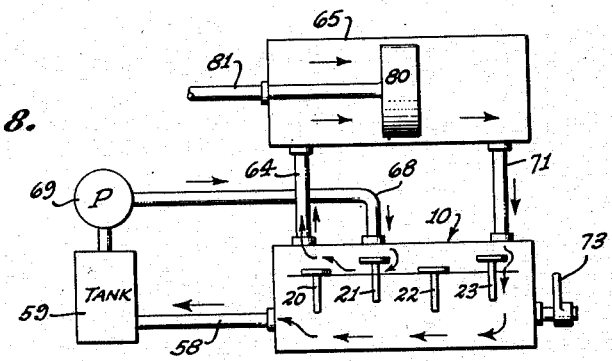
Fig. 8 is a diagrammatic illustration of the valve, the pump and cylinder connections showing one open position of the valve.
Figure 9:
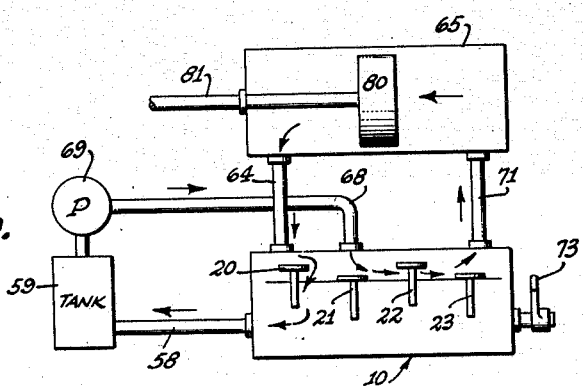
Fig. 9 is a view similar to Fig. 8 showing another open position of the valve.
Figure 10:
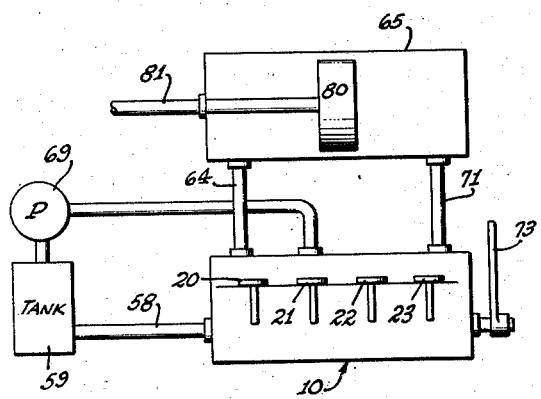
Fig. 10 is a view similar to Figs. 8 and 9 showing the valve in closed or locked position.

The valve operates in the following manner: There are three rotative positions of the valve lifter shaft 33 which may be termed the operating shaft. One position, which may be called neutral, is that illustrated in Figs. 1 and 10 in which all the valves are seated and all fluid flow is stopped thereby locking the mechanism operated by the valve in set position. As shown in Figs. 8 to 10 inclusive the cylinder 65 is provided with a piston 80 having a piston rod 81 which is connected in any suitable manner to the mechanism, the movement of which is to be controlled by the hydraulic system and the multiple valve shown.

In the neutral position, that is, with all the valves closed it is to be noted that the valves are held upon their respective seats by the pressure in the system of the pump 69. The pump 69 being connected through pipe 68 to the valve chamber 13 holds valve 22 on its seat and also valve 21 as the valve chambers 12 and 13 are in open communication with each other through port 67 thereby cutting off communication of the pump pressure through the valves 21 and 22.

What may be termed a second position is accomplished by turning the operating shaft 33 clockwise during which movement lifting cams 53 and 55 lift valves 21 and 23 as shown diagrammatically in Fig. 8. When the valves are in this position fluid pressure from the pump entering valve chamber 12 through pipe 68 passes through the open valve 21 into chamber 46 then through port 66 to valve chamber 11 above the valve 20. From valve chamber 11 the fluid pressure passes through pipe 64 to one end of the cylinder 65 causing the same to move in behind the piston causing the same to move in the direction of the arrow as shown in Fig. 8 and thereby operate the piston rod 81 and any mechanism connected thereto. The fluid in front of the moving piston 80 passes downwardly through pipe 71 into valve chamber 14 then to the open valve to chamber 48 through port 61, return passage 60, port 62 into chamber 45, then through ports 57 and pipe 58 to the tank 59. A third or reverse position is obtained by turning the shaft 33 in the opposite direction thereby through the medium of lifting cams 53 and 54 raising valves 20 and 22 off their seats. When in this position fluid pressure from the pump enters valve chamber 12 through pipe 68 then through passage 67 to valve chamber 13 and as such valve is open the fluid pressure passes through the open valve into chamber 47 then through pipe 71 into the opposite end of the cylinder 65, from that described in the last position so that the fluid pressure in the cylinder causing the piston 80 to travel in the direction of the arrow shown in the cylinder 65 as shown in Fig. 9. The fluid in front of the piston when the valve is in this position, passes through pipe 64 into valve chamber 11 then through the open valve 20 into chamber 45 then through ports 57 and pipe 58 to the tank 59.

The lifting cams on the operating shaft 33 are of smaller cross sectional area than the cross sectional area of the shaft. By reason of such construction the shaft may be inserted axially into the packing members, sleeves or other supporting members, thereby affording simple assembly of the parts without the use of split rings and similar devices.

The cross sectional shape of the respective lifter cams 52 to 55 inclusive, and the relation of the position of the cams to the valve seat seats is of extreme importance as these cams as heretofore mentioned are so arranged that the greatest moment of lifting force is applied to the valve stem at the instant of initial lift of the valve from its seat. This is accomplished by locating the center of the arcuate surface of the cam so that the center of eccentricity is at its greatest distance from the valve seat when the valve is seated thereon.

With the arrangement just described the valve may be operated at fluid pressure greatly beyond the pressures that may be controlled by valves in common use for similar purposes.

While I have shown and described the valve in what may be termed upright position, it is to be understood that the valve is so designed so as to work in any convenient position to accommodate the structure in the airplane. In fact, the valve may be installed just the reverse, that is, upside down from the position shown in the drawings in which case the springs 31 assist in keeping the valves on their seat, except when positively moved by means of the lifter cams.

I claim as my invention:

1. In fluid control means, a housing having a system of fluid passages including an inlet and an outlet, said housing having a plurality of valve chambers and having a bore at one end of said valve chambers; a valve in each valve chamber, said valves each having a stem extending into said bore, said stems being free of packing and of less cross-sectional area than any part of the chambers through which they extend whereby fluid is free to travel along the length of said stems when the respective valves are open; a shaft in said bore of less diameter than the bore having cam sections thereon engageable by the ends of said valve stems, certain of said cam sections being angularly displaced relative to the others whereby rotation of said shaft will selectively operate the valves; packing means around said shaft at spaced regions dividing said bore into chambers opposite the respective valve chambers, said chambers in said bore forming a part of the fluid passage system of the housing.

2. In fluid control means, a housing having a plurality of valve chambers and having a shaft bore communicating therewith; a valve in each valve chamber having a stem extending into said bore, said valve stems being free of packing and of less cross-sectional area than any part of the chambers through which they extend whereby fluid is free to travel along the entire length of the stems when the valves are open; a rotatable valve shaft in said shaft bore of less diameter than the bore, said shaft having cam sections thereon engageable by the ends of said valve stems, certain of said cam sections being angularly displaced relative to the others whereby rotation of said shaft will selectively operate the valves; and annular packing means surrounding said shaft dividing said bore into annular chambers opposite to and in communication with the respective valve chambers; said housing being provided with fluid passages connecting the outer ends of certain of said valve chambers with the annular chambers opposite the inner ends of certain other valve chambers, said housing having a fluid passage connecting certain other of said annular chambers with a common outlet, said housing having ports connecting the outer ends of certain of said valve chambers with the exterior of said housing.

3. In fluid control means, a housing having a plurality of aligned valve chambers and having a longitudinal bore at right angles thereto; a valve seat in each valve chamber; a poppet valve in each valve chamber adapted to engage the seat and having a stem extending through the opening in the seat and through the valve chamber into said bore, said valve stems being free of packing and of less cross-sectional area than any part of the passage through which they extend whereby fluid is free to travel along the entire length of the stems when the valves are open; guide means for the valve stems permitting said passage of fluid along the stems; a rotatable valve shaft in said bore of less diameter than the bore, said shaft having cam sections thereon engageable by the ends of said valve stems, certain of said cam sections being angularly displaced relative to the others whereby rotation of said shaft will selectively operate the valves; and annular packing means surrounding said shaft dividing said bore into annular chambers opposite to and in communication with the respective valve chambers; said housing being provided with fluid passages connecting the outer ends of certain of said valve chambers with the annular chambers opposite the inner ends of certain other valve chambers, said housing having a fluid passage connecting certain other of said annular chambers with a common outlet, said housing having ports connecting the outer ends of certain of said valve chambers with the exterior of said housing.

4. In fluid control means, a housing having a plurality of aligned valve chambers and having a longitudinal bore at right angles thereto; a valve seat in each valve chamber; a valve in each valve chamber adapted to engage the seat and having a stem extending through the opening in the seat and through the valve chamber into said bore, said valve stems being free of packing and of less cross-sectional area than any part of the passage through which they extend whereby fluid is free to travel along the entire length of the stems when the valves are open; a rotatable valve shaft in said bore of less diameter than the bore, said shaft having cam sections thereon engageable by the ends of said valve stems, certain of said cam sections being angularly displaced relative to the others whereby rotation of said shaft will selectively operate the valves; apertured sleeves spaced along said shaft, said sleeves receiving the respective valve stems through the apertures therein and being of less outer diameter than the diameter of the bore; and annular packing means between said sleeves and cooperating therewith to divide said bore into annular chambers surrounding each sleeve opposite to and in communication with the respective valve chambers; said housing being provided with fluid passages connecting the outer ends of certain of said valve chambers with the annular chambers opposite the inner ends of certain other valve chambers, said housing having a fluid passage connecting certain other of said annular chambers with a common outlet, said housing having ports connecting the outer ends of certain of said valve chambers with the exterior of said housing.

5. In fluid control means, a housing having four valve chambers therein arranged in a row and having a longitudinal bore at right angles to said chambers and communicating therewith; a valve in each chamber intermediate the ends thereof and having a stem extending into said bore; a rotatable shaft in said bore of less diameter than the bore; cams on said shaft engaging said valve stems, certain of said cam sections being angularly displaced relative to the others; packing means surrounding said shaft and cooperating therewith to divide said bore into four annular chambers respectively located at the inner ends of the respective valve chambers and open thereto; means for rotating said shaft to selectively open said valves; said housing having a fluid passageway connecting the endmost annular chambers of the longitudinal bore, having an exhaust port communicating with one of said endmost annular chambers, having an inlet port communicating with the outer end of one of said intermediate valve chambers, having a fluid passageway connecting the intermediate valve chambers at their outer ends, having a pair of fluid passageways connecting the outer ends of the endmost valve chambers with the inner ends of the two intermediate valve chambers, and having ports connecting the outer ends of the endmost valve chambers with the exterior of said housing.

6. In fluid control means, a housing having four valve chambers therein arranged in a row and having a longitudinal bore at right angles thereto and communicating therewith; a valve in each chamber intermediate the ends thereof having a valve stem extending into said longitudinal bore; said stems being free of packing and of less cross sectional area than any part of the chambers through which they extend whereby fluid is free to travel along the length of said stems when the respective valves are open; a rotatable shaft in said bore of less diameter than the bore; cams on said shaft engageable with said valve stems, certain of said cam sections being angularly displaced relative to the others; apertured sleeves spaced along said shaft, said sleeves receiving the respective valve stems through the apertures therein and being of less outer diameter than the diameter of the bore; annular packing means between said sleeves and cooperating therewith to divide said bore into four annular chambers respectively located at the inner ends of the respective valve chambers and communicating therewith; means for rotating said shaft to selectively open said valves; said housing having a fluid passageway connecting the endmost annular chambers of the longitudinal bore, having an exhaust port communicating with one of said endmost annular chambers, having an inlet port communicating with the outer end of one of said intermediate valve chambers, having a fluid passageway connecting the intermediate valve chambers at their outer ends, having a pair of fluid passageways connecting the outer ends of the endmost valve chambers with the inner ends of the two intermediate valve chambers, and having ports connecting the outer ends of the endmost valve chambers with the exterior of said housing.

HOBART F. FRIMEL.